(12) United States Patent
Oota et al.

(10) Patent No.: US 7,471,964 B2
(45) Date of Patent: *Dec. 30, 2008

(54) MOBILE COMMUNICATION TERMINAL

(75) Inventors: Hisashi Oota, Hino (JP); Yoshiaki Machida, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 11/516,630

(22) Filed: Sep. 7, 2006

(65) Prior Publication Data

US 2007/0123228 A1    May 31, 2007

Related U.S. Application Data

(62) Division of application No. 10/238,684, filed on Sep. 11, 2002, now Pat. No. 7,120,470.

(30) Foreign Application Priority Data

Sep. 28, 2001  (JP) .............................. 2001-303418

(51) Int. Cl.
    H04M 1/00  (2006.01)
(52) U.S. Cl. ................. 455/566; 455/556.1; 379/88.13; 704/235

(58) Field of Classification Search ................ 455/3.01, 455/556.1, 566; 379/88.13; 342/179; 704/235, 704/260, E21.02
See application file for complete search history.

(56) References Cited

U.S. PATENT DOCUMENTS

| | | |
|---|---|---|
| 6,248,944 B1 | 6/2001 | Ito |
| 6,295,380 B1 | 9/2001 | Takahashi |
| 6,597,737 B1 | 7/2003 | Kondo et al. |
| 6,711,379 B1 | 3/2004 | Owa et al. |

FOREIGN PATENT DOCUMENTS

| | | |
|---|---|---|
| JP | 04-223755 | 8/1992 |
| JP | 10-149270 | 6/1998 |
| JP | 11-103316 | 4/1999 |
| JP | 2001-222433 | 8/2001 |

OTHER PUBLICATIONS

Decision on Trial issued in Japanese Patent Application No. 2001-303418, dated Dec. 7, 2007, and translation thereof.

*Primary Examiner*—Md S Elahee
(74) *Attorney, Agent, or Firm*—Finnegan, Henderson, Farabow, Garrett & Dunner, L.L.P.

(57) ABSTRACT

When reproducing a multimedia file received by a receiving section, a control section controls a sound reproduction section to reproduce a sound on the basis of sound data. Further, the control section controls a display section to display an image on the basis of image data if the multimedia file contains the image data, and controls the display section to display a prepared substitute image if the multimedia file contains no image data.

9 Claims, 6 Drawing Sheets

MOBILE COMMUNICATION TERMINAL

CROSS-REFERENCE TO RELATED APPLICATIONS

This is a divisional of application Ser. No. 10/238.684, filed Sep. 11, 2002 now U.S Pat. No. 7,120,470, which is incorporated in its entirety herein by reference. This application is also based upon and claims the benefit of priority from the prior Japanese Patent Application No. 2001-303418, filed Sep. 28, 2001, the entire contents of which are incorporated herein by reference.

BACKGROUND OF THE INVENTION

1. Field of the Invention

The present invention relates to a mobile communication terminal, such as a mobile telephone ready for, for example, motion-picture-delivery services, the terminal receiving and reproducing a multimedia file that can contain both image data and sound data.

2. Description of the Related Art

In motion-picture-delivery services provided via mobile telephone networks, multimedia files that can contain motion picture and sound data are transmitted.

Mobile telephones ready for motion-picture-delivery services extract motion picture and sound data from multimedia files transmitted via mobile telephone networks, enabling reproduction of the contents.

Multimedia files do not always contain motion picture data. If a file only contains sound data, only this is reproduced, and nothing is displayed. This can cause confusion with the user, who may believe that all multimedia files contain motion pictures, whereas they may only contain sound data.

BRIEF SUMMARY OF THE INVENTION

It is an object of the invention to enable users to recognize that a multimedia file containing no image data is being normally reproduced.

According to an aspect of the invention, there is provided a mobile communication terminal comprising: a sound reproduction section which reproduces sound on the basis of sound data; a display section which displays an image on the basis of image data; a receiving section which receives a multimedia file which can contain both the image and sound data; and a control section which executes control to reproduce the multimedia file received by the receiving section, the control section controlling the sound reproduction section to reproduce the sound based on the sound data, the control section controlling the display section to display an image based on the image data if the multimedia file contains the image data, and the control section controlling the display section to display a prepared substitute image if the multimedia file contains no image data.

According to another aspect of the invention, there is provided a mobile communication terminal comprising: a sound reproduction section which reproduces sound on the basis of sound data; a display section which displays an image on the basis of image data; a receiving section which receives a multimedia file which contains at least one of the image and sound data; and a control section which executes control to reproduce the multimedia file received by the receiving section, the control section controlling the sound reproduction section to reproduce sound based on the sound data if the multimedia file contains the sound data, the control section controlling the display section to display an image based on the image data if the multimedia file contains the image data, and the control section controlling the display section to display a prepared substitute image if the multimedia file contains no image data.

According to yet another aspect of the invention, there is provided a mobile communication terminal comprising: a sound reproduction section which reproduces sound on the basis of sound data; a display section which displays an image on the basis of image data; a storage section which stores substitute data indicative of a predetermined substitute image; a receiving section which receives a multimedia file which contains at least one of the image and sound data; and a control section which executes control to reproduce the multimedia file received by the receiving section, the control section controlling the sound reproduction section to reproduce sound based on the sound data if the multimedia file contains the sound data, the control section controlling the display section to display an image based on the image data if the multimedia file contains the image data, and the control section controlling the display section to display a substitute image based on the substitute data stored in the storage section if the multimedia file contains no image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention will be described with reference to the accompanying drawings.

Figure 1:
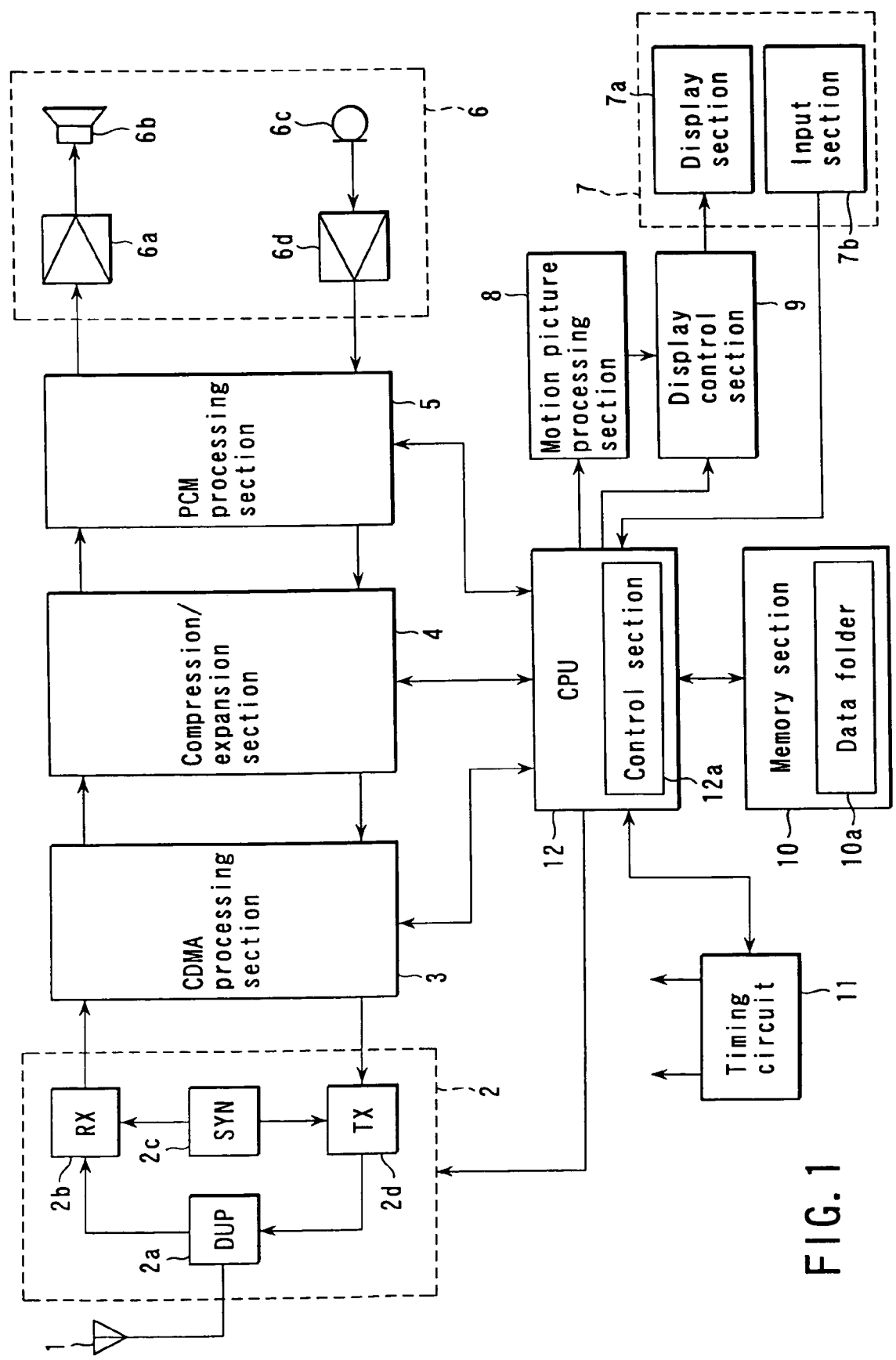
FIG. 1 is a block diagram illustrating a mobile telephone according to an embodiment of the invention.

FIG. 1 is a block diagram illustrating a mobile telephone according to the embodiment of the invention.

As shown in FIG. 1, the mobile telephone of the embodiment comprises an antenna 1, radio section 2, CDMA processing section 3, compression/expansion section 4, PCM processing section 5, call section 6, user interface section 7, motion picture processing section 8, display control section 9, memory section 10, timing circuit 11 and CPU 12. The radio section 2 incorporates a duplexer (DUP) 2a, receiving circuit (RX) 2b, frequency synthesizer (SYN) 2c and transmission circuit (TX) 2d. The call section 6 incorporates a receiver amplifier 6a, receiver 6b, microphone 6c and transmission amplifier 6d. The user interface section 7 incorporates a display section 7a and input section 7b.

A radio signal transmitted from a base station (not shown) is received by the antenna 1 and input to the radio section 2. In the radio section 2, the radio signal is input to the receiving circuit 2b via the duplexer 2a. The receiving circuit 2b mixes the radio signal with a receiver-side local oscillation signal output from the frequency synthesizer 2c, thereby converting the radio signal into an intermediate frequency signal. The frequency of the receiving-side local oscillation signal output from the frequency synthesizer 2c is set on the basis of a control signal output from the CPU 12.

The intermediate frequency signal is input to the CDMA processing section 3, where it is subjected to a despread process using a spread code assigned to each receiving channel. Subsequently, the CDMA processing section 3 executes orthogonal demodulation corresponding to, for example, QPSK (Quadrature Phase Shift Keying) modulation, thereby converting the signal into demodulation data or packet data of a predetermined format. After that, the CDMA processing section 3 supplies the converted demodulation data to the compression/expansion section 4, and supplies the packet data to the CPU 12.

The compression/expansion section 4 executes expansion on the demodulation data from the CDMA processing section 3, according to a reception data rate supplied from the CPU 12. This section also carries out decoding, using, for example, Viterbi, and error correction/decoding, thereby reproducing baseband sound data. Expansion is carried out under QCELP or EVRC. The resultant sound data is sent to the PCM processing section 5.

The PCM processing section 5 executes PCM decoding on the digital sound data output from the compression/expansion section 4, thereby providing an analog sound signal. The sound signal is amplified by the receiver amplifier 6a and output in the form of sound from the receiver 6b.

The microphone 10 converts sound waves from the user into a sound signal. This sound signal is input to the transmission amplifier 6d, where it is amplified, then output to PCM processing section 5.

The PCM processing section 5 executes PCM encoding processing on the sound signal, thereby providing digital sound data. The sound data is then supplied to the compression/expansion section 4.

The compression/expansion section 4 detects the energy level of the sound data, and determines the data rate accordingly. Subsequently, the sound data is compressed into a signal format corresponding to the data rate, using QCELP. Thereafter, the sound data is subjected to error correction encoding based on, for example, convolutional encoding, and is output to the CDMA processing section 3.

The CDMA processing section 3 multiplexes transmission data of different transmission channels individually supplied from the compression/expansion section 4. After that, the CDMA processing section 3 modulates a carrier signal using the multiplexed transmission data. For this modulation, QPSK is used, for example. The CDMA processing section 3 obtains a transmission signal by executing spectrum spread processing on the modulated carrier signal, using a PN code assigned to the transmission channel of the multiplexed transmission data. Thereafter, the CDMA processing section 3 supplies the transmission signal to the transmission circuit 2d of the radio section 2.

The transmission circuit 2d mixes the transmission signal with a transmission-side local oscillation signal generated by the frequency synthesizer 2c, thereby obtaining a radio frequency signal. Subsequently, the transmission circuit 2d amplifies only the effective portion of the radio frequency signal on the basis of the transmission data rate supplied from the CPU 12, and outputs the resultant signal. The radio frequency signal output from the transmission circuit 2d is supplied to the antenna 1 via the duplexer 2a, and is transmitted to the connected base station via the antenna 1.

The input section 7b has a key group that includes dial keys, a transmission key, power supply key, end key, volume adjusting key and mode designating key, etc. The user of the mobile phone inputs an instruction by pushing a key incorporated in the input section 7b. The display section 7a is provided with an LCD (Liquid Crystal Display) and an LED (Light Emitting Diode), etc. Using the LCD and LED, the display section 7a displays the other party's mobile phone number, the operational status, e.g. incoming call status, battery status, of the users mobile phone, information downloaded from a web site, transmitted/received mail, motion picture data, etc.

Upon receiving motion picture data from the CPU 12, the motion picture processing section 8 decodes the motion picture data to thereby obtain motion picture display data for displaying a motion picture on the display section 7a. The motion picture processing section 8 supplies the motion picture display data to the display control section 9. The CPU 12 also supplies motion picture display data or still image display data to the display control section 9. The display control section 9 drives the display section 7a on the basis of the motion picture display data and still image display data, so as to display a motion picture or still image.

The memory section 10 is, for example, a ROM, DRAM (Dynamic RAM), SRAM (Static RAM), flash memory, etc. The memory section 10 stores an operation program for the CPU 12. The memory section 10 also stores various data such as setting information, received data, data created by the mobile phone, etc. A part of the memory section 10 is used as a data folder 10a. The data folder 10a can store a plurality of arbitrary image data items whose storage is designated by the user.

The timing circuit 11 generates a reference clock of a predetermined speed. The timing circuit 11 supplies the generated reference clock to each circuit section in the mobile phone, such as the CPU 12, which needs an operation clock.

The CPU 12 controls each section by software processing based on the operation program that is stored in the memory section 10, thereby realizing the operations of the mobile telephone. Further, the CPU 12 serves as a control section 12a. The control section 12a controls the reproduction of a multimedia file upon the reception of the file.

The operation of the mobile phone constructed as above will now be described, omitting description of standard mobile phone functions, such as sound communication, receiving multimedia files, since these processes are similar to conventional ones. Instead, only operations related to reproduction of a received multimedia file will be described in detail.

Figure 2:
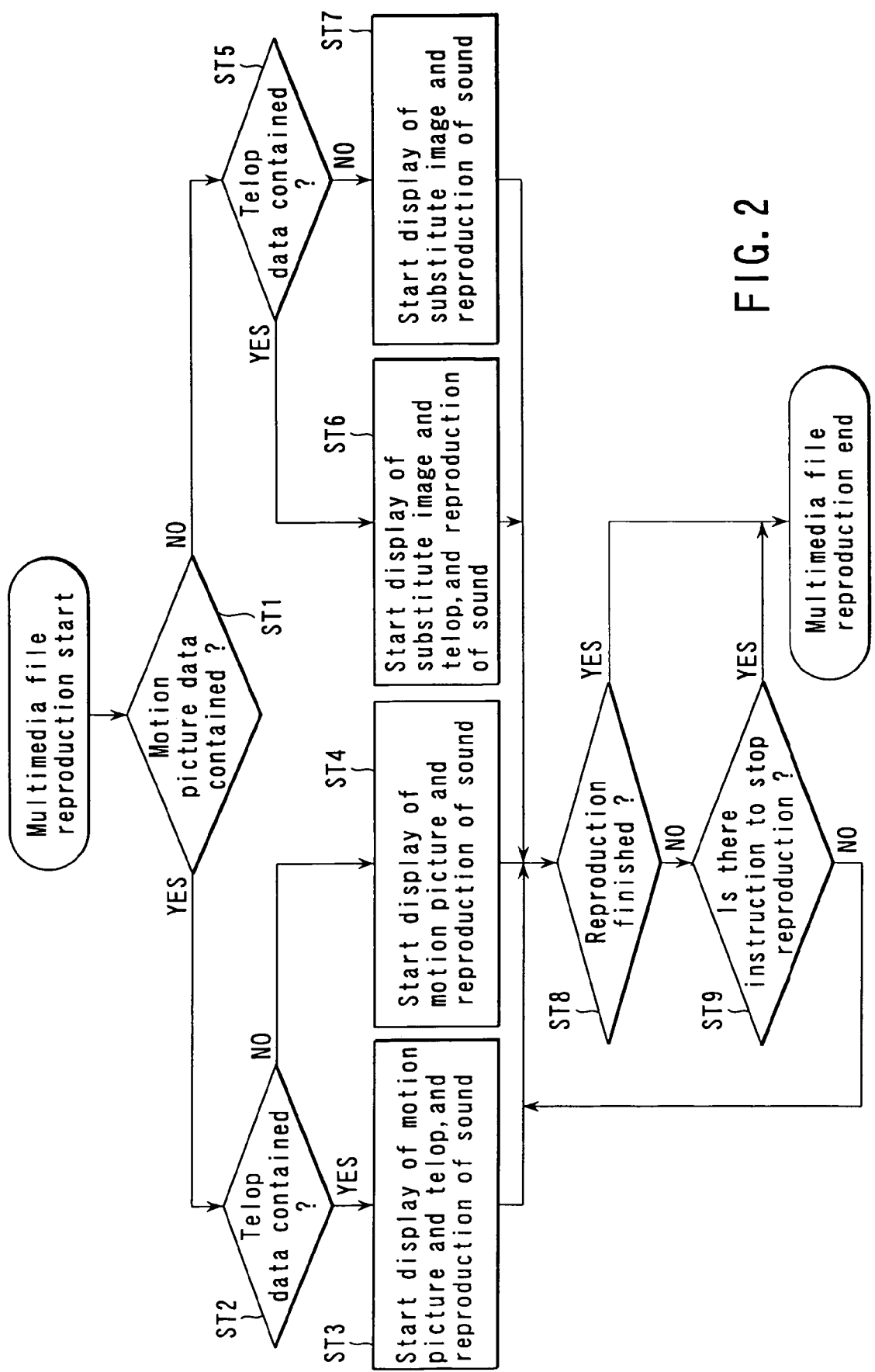
FIG. 2 is a flowchart useful in explaining a process for reproducing a multimedia file.

Firstly, when it is necessary to reproduce a multimedia file, the CPU 12 executes processing for the reproduction of the multimedia file as shown in FIG. 2.

At a step ST1, the CPU 12 determines whether or not the to-be-reproduced multimedia file contains motion picture data. If it determines that the to-be-reproduced multimedia file contains motion picture data, the CPU 12 determines at the next step ST2 whether or not the to-be-reproduced multimedia file contains telop data.

If it determines that the to-be-reproduced multimedia file contains telop data, the CPU 12 starts, at a step ST3, display of a motion picture and a telop and reproduction of sound.

Figure 3A:
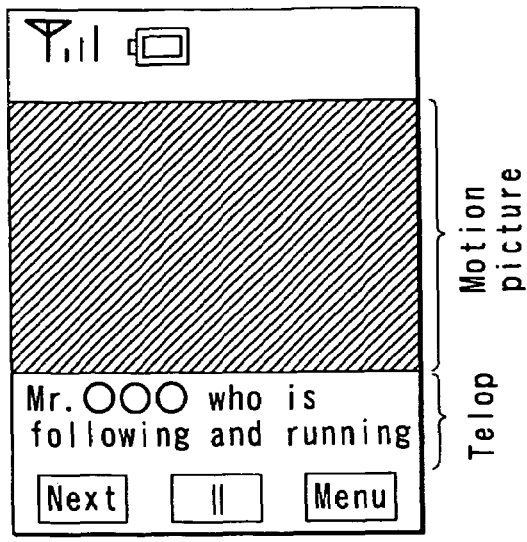
FIGS. 3A-3D are examples of display used during multimedia file reproduction.

Specifically, the CPU 12 extracts motion picture data from the multimedia file and supplies it to the motion picture processing section 8. The motion picture processing section 8 decodes the motion picture data, thereby obtaining motion picture display data and supplying it to the display control section 9. Further, the CPU 12 extracts telop data from the multimedia file and generates image data for a telop on the basis of the extracted data. The CPU 12 supplies the telop image data to the display control section 9. The display control section 9 superimposes the telop image data on the motion picture data and into a predetermined format, and drives the display section 7a to execute, for example, the display shown in FIG. 3A. The CPU 12 also extracts sound data from the multimedia file, and supplies it to the compression/expansion section 4 if it is compressed using the QCELP system. After being expanded by the compression/expansion section 4, the sound data is converted into an analog sound signal by PCM decoding in the PCM processing section 5, and is output as a sound from the receiver 6b. If the sound data extracted from the multimedia file is MP3 data, the CPU 12 expands the sound data and supplies the expanded PCM data to the PCM processing section 5, where the PCM data is converted into an analog sound signal by PCM decoding, and is output as a sound from the receiver 6b.

Figure 3B:
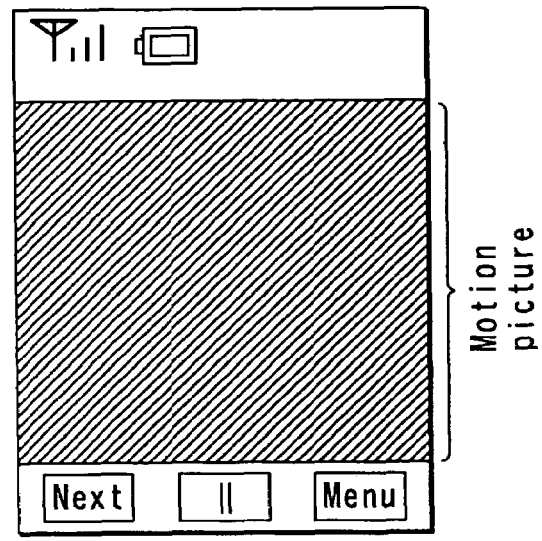

On the other hand, if the CPU 12 determines at the step ST2 that the multimedia file contains no telop data, it starts, at a step ST4, display of a motion picture and reproduction of sound. Specifically, the CPU 12 extracts motion picture data from the multimedia file and supplies it to the motion picture processing section 8. The motion picture processing section 8 decodes the motion picture data, thereby obtaining motion picture display data and supplying it to the display control section 9. If the display control section 9 thus receives only motion picture display data, it drives the display section 7a to execute, for example, the display shown in FIG. 3B. The CPU 12 also extracts sound data from the multimedia file, and carries out sound reproduction based on the extracted sound data in the same manner as the above.

If the CPU 12 determines at the step ST1 that the to-be-reproduced multimedia file contains no motion picture data, it subsequently determines at a step ST5 whether or not the multimedia file contains telop data.

If the CPU 12 determines that the multimedia file contains telop data, it starts, at a step ST6, display of a substitute image and a telop and reproduction of sound. The substitute image is prepared as an image to be displayed instead of a motion picture. Specifically, the CPU 12 extracts telop data from the multimedia file, and generates image data indicative of an image that is formed by superimposing a telop produced from the telop data on the substitute image. The CPU 12 supplies the image data to the display control section 9. When the display control section 9 has thus received image data only from the CPU 12, it drives, on the basis of the image data, the display section 7a to execute, for example, the display shown in FIG. 3C. The CPU 12 also extracts sound data from the multimedia file, and causes sound reproduction based on the extracted sound data in the same manner as the above.

On the other hand, if the CPU 12 determines at the step ST5 that the to-be-reproduced multimedia file contains no telop data, it starts, at a step ST7, display of a substitute image and reproduction of sound. Specifically, the CPU 12 supplies image data indicative of the substitute image to the display control section 9. When the display control section 9 has thus received image data only from the CPU 12, it drives, on the basis of the image data, the display section 7a to execute, for example, the display shown in FIG. 3D. The CPU 12 also extracts sound data from the multimedia file, and causes sound reproduction based on the extracted sound data in the same manner as the above.

After starting the reproduction of the multimedia file at the step ST3, ST4, ST6 or ST7, the CPU 12 waits, at steps ST8 and ST9, for the completion of the reproduction or an instruction, issued by the user, to stop the reproduction. If the reproduction has completed, or if the stop of the reproduction has been designated by the user, the CPU 12 stops the operation started at the step ST3, ST4, ST6 or ST7, thereby finishing the multimedia file reproduction processing.

Figure 3C:
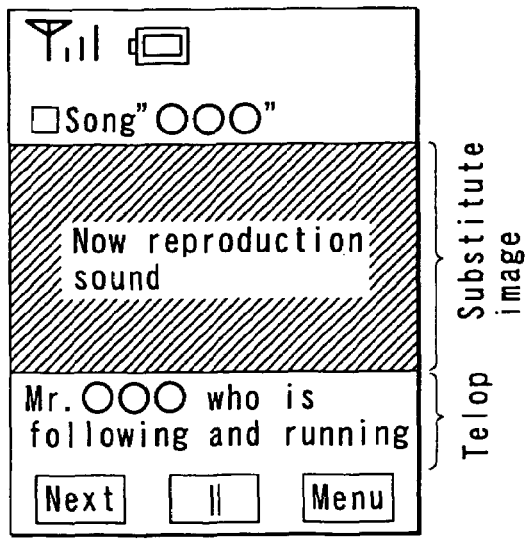
Figure 3D:
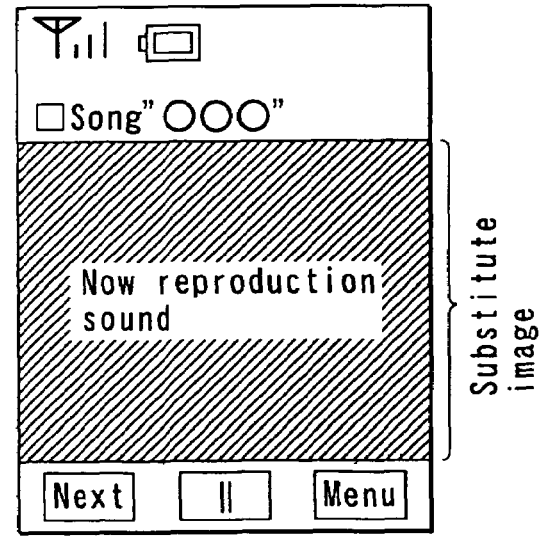

The substitute image shown in FIG. 3C or 3D contains a message "Now Reproduction Sound" in a predetermined background area of a certain color indicated by hatching. This image data is generated by the CPU 12. The displayed images are default substitute image examples.

In the mobile telephone of the embodiment, any arbitrary image may be used as a substitute image, as well as the default images. To this end, at the steps ST6 and ST7, the CPU 12 outputs, to the display control section 9, image data indicative of an image set as the substitute image.

Figure 4:
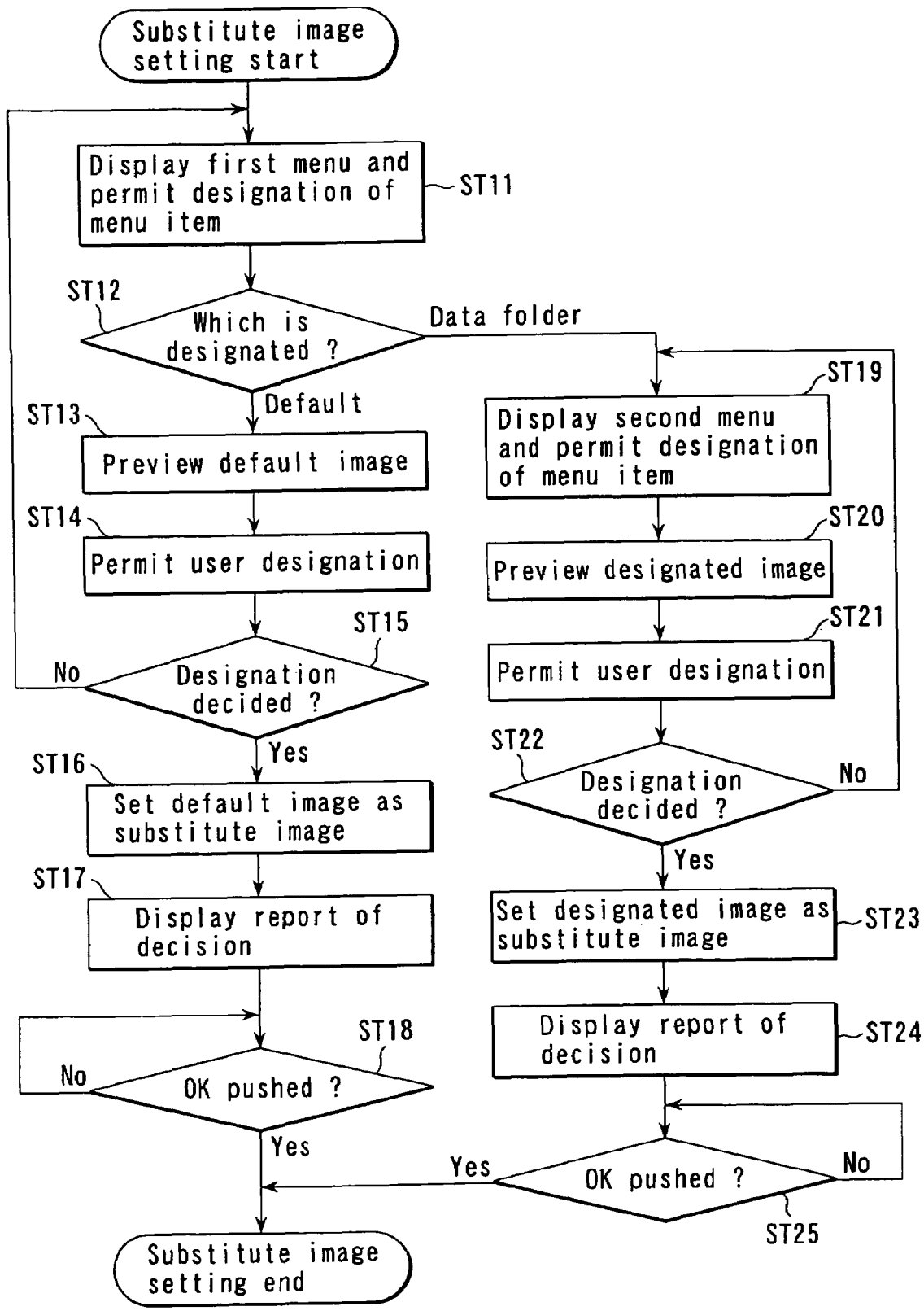
FIG. 4 is a flowchart illustrating a process for setting a substitute image.

When the user has requested to change the substitute image, the CPU 12 executes the substitute image setting process illustrated in FIG. 4.

Figure 5A:
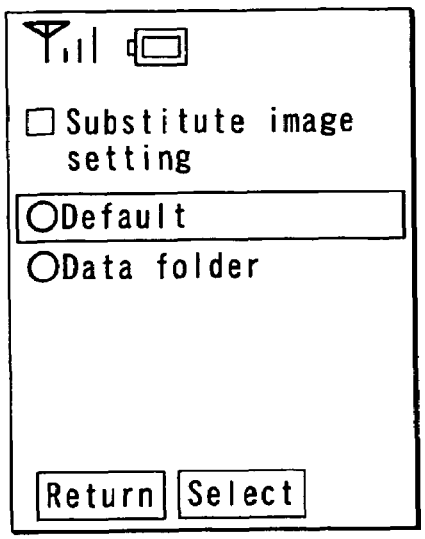
FIGS. 5A-5F are examples of display used during substitute image setting process.

In the substitute image setting process, firstly, the CPU 12 causes, at a step ST11, the display section 7a to display a first menu as shown, for example, in FIG. 5A, thereby permitting one of the items of the menu to be designated. As shown in FIG. 5A, the first menu is provided so that the user can choose whether the default image or an image stored in a data folder 10a should be used. After the user has chosen, the CPU 12 determines, at a step ST12, which one has been designated.

Figure 5B:
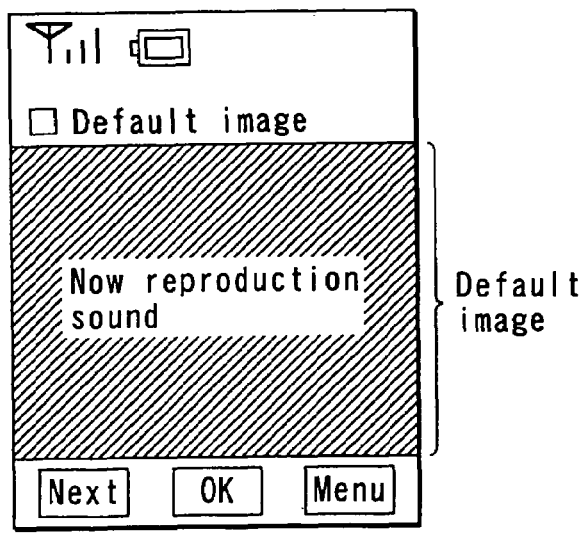
Figure 5C:
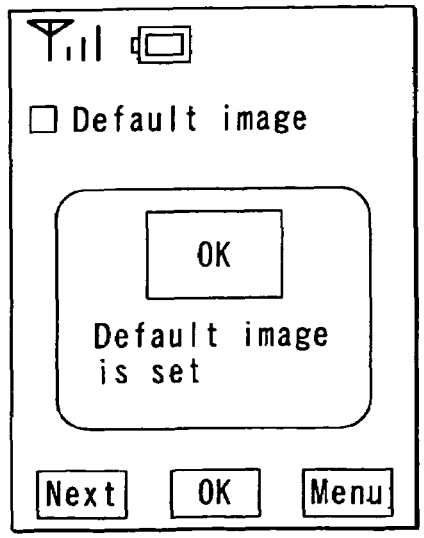

After determining that the default image has been designated, the CPU 12 previews, at a step ST13, the default image on the display section 7a as shown in FIG. 5B. With the default image displayed, the CPU 12 permits, at a step ST14, the user to decide whether or not the default image should be set. After the user pushes a button, the CPU 12 determines at a step ST15 whether or not the user has decided. If it determines that the user has not decided, the CPU 12 returns the process to the step ST11. On the other hand, if it determines that the user has decided, the CPU 12 sets the default image as the substitute image at a step ST16. At the next step ST17, the CPU 12 displays a message confirming the user's decision, via display section 7a, as shown in FIG. 5C. CPU 12 waits for the user to push the OK button at a step ST18. If the user has pushed the OK button, the CPU 12 finishes the substitute image setting process.

Figure 5D:
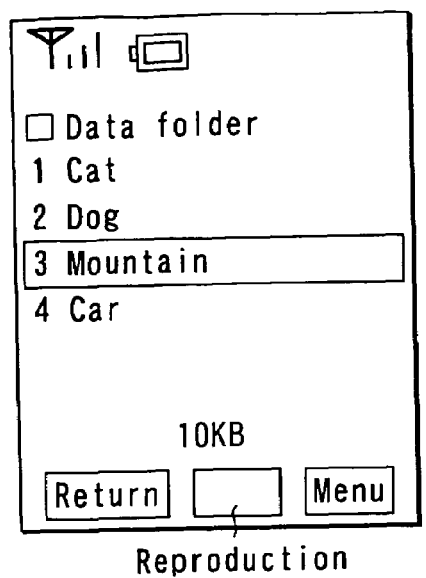
Figure 5E:
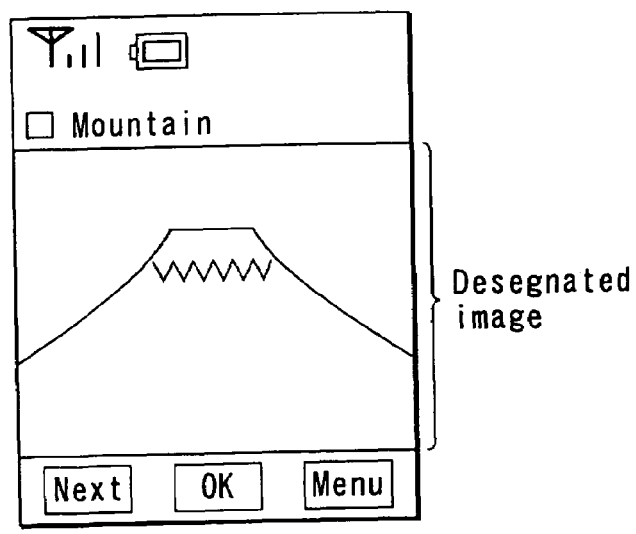
Figure 5F:
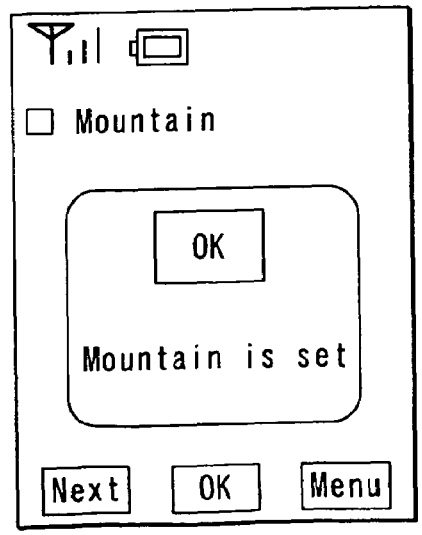

If, on the other hand, it determines at the step ST12 that an image stored in the data folder 10a has been designated, the CPU 12 displays the second menu shown in, for example, FIG. 5D at a step ST19, thereby permitting the user to designate one of the items of the second menu. As shown in FIG. 5D, the second menu provides a list of titles assigned to the images stored in the data folder 10a, and permits the user to designate one of the titles. After the user has designated one of the titles, the CPU 12 previews, at a step ST20, the image designated by the user on the display section 7a as shown in FIG. 5E. With the designated image displayed, the CPU 12 permits, at a step ST21, the user to decide whether or not the designated image should be set. After the user has made an operation, the CPU 12 determines at a step ST22 whether or not the user has decided the designation. If it determines that the user has not decided the designation, the CPU 12 returns the process to the step ST19. On the other hand, if it determines that the user has decided the designation, the CPU 12 sets the designated image as the substitute image at a step ST23. At the next step ST24, the CPU 12 causes the display section 7a to display a report of decision as shown in FIG. 5F. In this state, the CPU 12 waits for the user to push the OK button at a step ST25. If the user has pushed the OK button, the CPU 12 finishes the substitute image setting process.

As described above, the image set as the substitute image is used in the multimedia file reproduction process. The data folder 10a may store a picture or photograph, as image data. Further, image data may be prestored in the data folder 10a. The user may also store image data there. In summary, in the above-described embodiment, when a multimedia file is reproduced, even if the file does not contain motion picture data, a substitute image is displayed in its place. Thus, the motion picture display area of the display section 7a always displays a certain image. As a result, the user need not worry when nothing appears on the display, and can enjoy an image and sound at the same time.

Moreover, in the embodiment, since the image used as a substitute can be changed, the user can arbitrarily set any image as a substitute.

The invention is not limited to the above-described embodiment, and is also applicable to a mobile communication terminal for receiving and reproducing multimedia files that contain still image data.

Further, a motion picture may be used as the substitute image, or a single image may consistently be used.

The invention may be a mobile communication terminal of a system other than CDMA, or another type of mobile communication terminal, such as a PHS.

In addition, sound reproduction based on sound data contained in a multimedia file may be executed using a speaker, instead of the receiver 6b.

Furthermore, an earphone or headphone may be connected to enable sound reproduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal comprising:
 a receiving section which receives a data file from an external terminal having a format to accommodate both first image data and sound data;
 a memory which stores a second image data to be used for informing that the received data file does not include the first image data;
 a sound outputting section which outputs sound based on the sound data included in the received data file;
 a display section which selectively displays an image based on one of the first image data included in the received data file and the second image data stored in the memory; and
 a control section which controls the sound outputting section and the display section;
 wherein the control section:
 checks whether or not the received data file includes both first image data and sound data after the receiving section receives the data file from the external terminal;
 controls the display section to display the first image data included in the received data file and the sound outputting section to output the sound data included in the received data file, if the received data file includes both first image data and sound data; and
 controls the display section to display the second image data stored in the memory to indicate that the data file does not contain the first image data and the sound outputting section to output the sound data included in the received data file, if the received data file contains only the sound data.

2. The mobile communication terminal according to claim 1, wherein the second image data is a character message.

3. The mobile communication according to claim 1, wherein the second image data is a motion image.

4. A mobile communication terminal comprising:
 a receiving section which receives a data file having a format to accommodate both first image data and sound data;
 a memory which stores the data file received by the receiving section and a second image data to be used for informing that the data file does not include the first image data;
 a sound outputting section which outputs sound based on the sound data included in the received data file;
 a display section which selectively displays an image based on one of the first image data included in the received data file and the second image data stored in the memory; and
 a control section which controls the sound outputting section and the display section;
 wherein the control section:
 checks whether or not the received data file includes both first image data and sound data after the receiving section receives the data file;
 controls the display section to display the first image data included in the data file and the sound outputting section to output the sound data included in the received data file, if the received data file includes both first image data and sound data; and
 controls the display section to display the second image data stored in the memory to indicate that the data file does not contain the first image data and the sound outputting section to output the sound data included in the received data file, if the received data file contains only the sound data.

5. The mobile communication terminal according to claim 4, wherein the second image data is a character message.

6. The mobile communication terminal according to claim 4, wherein the second image data is a motion image.

7. A mobile communication terminal comprising:
 a memory which stores a received data file capable of accommodating both first image data and sound data, and a second image data to be used for informing that the data file does not contain the first image data;
 a sound outputting section which outputs sound based on the sound data included in the received data file;
 a display section which selectively displays an image based on one of the first image data included in the received data file and the second image data stored in the memory; and
 a control section which controls the sound outputting section and the display section;
 wherein the control section:
 checks whether or not the received data file includes both first image data and sound data after the receiving section receives the data file;
 controls the display section to display the first image data included in the received data file and the sound outputting section to output the sound data included in the received data file, if the received data file includes both first image and sound data; and controls the display section to display the second image data stored in the memory to indicate that the data file does not contain the first image data and the sound outputting section to output the sound data included in the received data file, if the received data file contains only the sound data.

8. The mobile communication terminal according to claim 7, wherein the second image data is a character message.

9. The mobile communication terminal according to claim 7, wherein the second image data is a motion image.

* * * * *